March 23, 1954     J. O. GRADY     2,672,703
LICENSE PLATE FRAME
Filed June 25, 1951
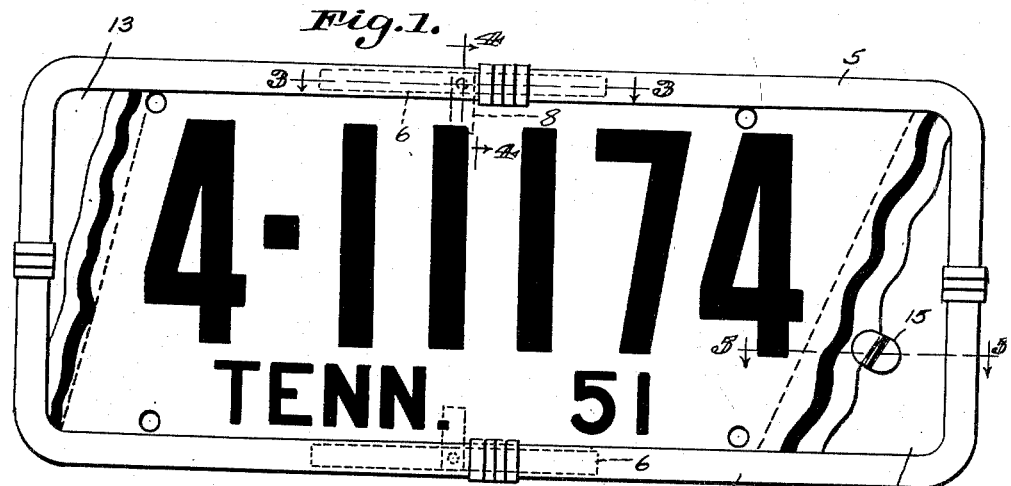
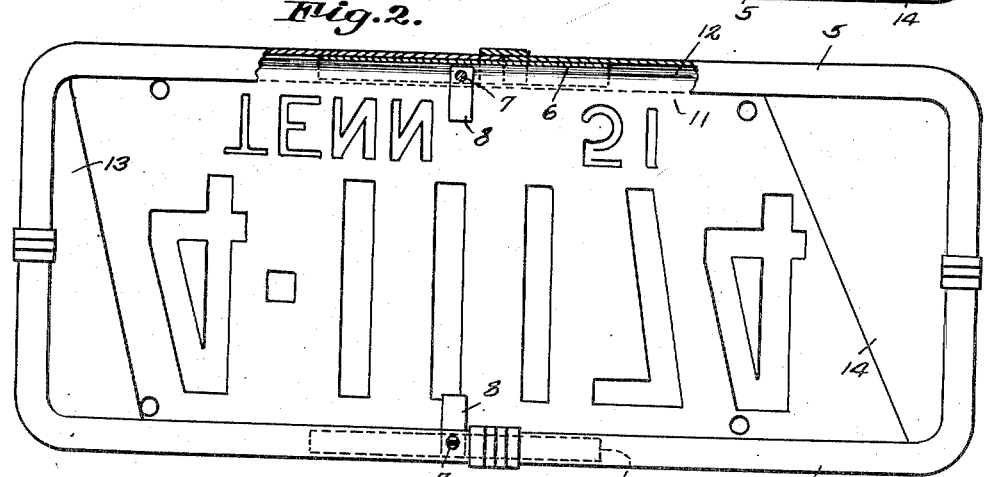
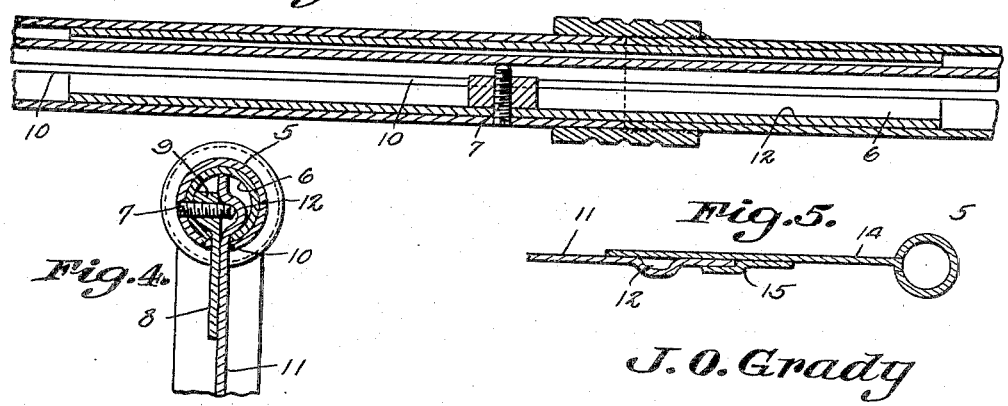
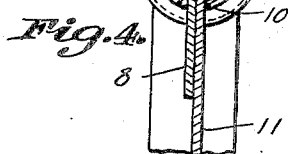
J. O. Grady
INVENTOR,
BY *C. A. Snow & Co.*
ATTORNEYS.

Patented Mar. 23, 1954

2,672,703

UNITED STATES PATENT OFFICE 2,672,703

LICENSE PLATE FRAME

John O. Grady, Arab, Ala.

Application June 25, 1951, Serial No. 233,345

1 Claim. (Cl. 40—125)

This invention relates to motor vehicle license plate frames, an important object of the invention being to provide a license plate frame embodying telescoping sections, said telescoping sections having aligning openings for the reception of securing screws for holding the sections of the frame together around the license plate.

Another object of the invention is to provide pivoted clips also held in position by the screws, the clips having heads at their inner ends fitted within and housed by the telescoping sections of the frame, the heads providing means for drawing the telescoping sections together, securing the sections against accidental displacement and at the same time affording means to prevent vibrations of the license plate, thereby eliminating noise of the license plate when the vehicle is moving over irregular road surfaces.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Fig. 1 is a front elevational view of a license plate frame positioned around a license plate, supporting the license plate.

Fig. 2 is a rear elevational view of a license plate equipped with a license plate frame constructed in accordance with the present invention, the pivoted tabs of the frame being shown as extended over the back of the license plate.

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

Referring to the drawing in detail, the license plate embodies a pair of tubular sections 5 bent to conform to the shape of a vehicle license plate, so that when the tubular sections are placed around a license plate they will provide a complete frame.

These tubular sections are held together by means of the tubular members 6 that are positioned within the ends of adjacent tubular sections, the tubular members 6 being provided with threaded openings to receive the screws 7, which also pass through openings in the tubular section 5 at one end of the frame.

The reference character 8 indicates tabs which are formed with heads 9, the surfaces of the heads 9 being curved conforming to the curvature of the tubular members 6, in which they are held, the tabs being of lengths to extend through the slot 10 extending around the frame on the inner side thereof, where they overlie substantial portions of the plate mounted within the frame, and indicated by the reference character 11. As shown by Fig. 4 of the drawing, the heads of the tabs are formed with openings to receive the screws 7 so that the heads will be drawn into close contact with the tubular members 6 when the screws are rotated in one direction, the inner ends of the screws lying within the marginal groove 12 formed in the license plate mounted within the frame.

At opposite corners of the frame are the plates 13 and 14, the plate 14 being provided with the clip 15 extending forwardly from the front surface thereof, the clip 15 being so constructed and arranged that one edge of the license plate 11 will fit thereunder, holding the license plate rigidly against vibrating.

From the foregoing it will be seen that due to the construction of the pivoted tabs 8, the heads 9 of the tabs will provide means for drawing the cooperating telescoping sections of the frame together, and at the same time strengthen and reinforce the body portion of the license plate by contact of the tabs 8 with said license plate.

Having thus described the invention, what is claimed is:

A frame for holding license plates having a marginal groove, comprising sectional upper and lower tubular members having connected right-angled end portions, said frame having a slot formed around the inner edge thereof in which the edge and marginal groove of a license plate are disposed, tubular connecting members extending into and connecting the adjacent ends of the sections of the upper and lower tubular members, said tubular connecting members having slots aligning with the slot formed around the inner edge of the frame, tabs having curved heads fitted within the tubular connecting members and extending through the slot formed along the inner edge of the frame, said heads having threaded openings, set screws extending through the frame and threaded in the openings of the heads of the tabs, the set screws passing into the marginal groove of the license plate held within the frame, and said tabs extending over said license plate in contact therewith holding the license plate against vibrating within the frame.

JOHN O. GRADY.

References Cited in the file of this patent

UNITED STATES PATENTS

| Number | Name | Date |
|---|---|---|
| 1,218,761 | Grant | Mar. 13, 1917 |
| 1,845,334 | Ritz Woller | Feb. 16, 1932 |
| 1,936,287 | Campbell | Nov. 21, 1933 |
| 1,983,614 | Kenny | Dec. 11, 1934 |
| 1,995,984 | Hudson | Mar. 26, 1935 |
| 2,082,732 | Campbell | June 1, 1937 |